(12) United States Patent
Nicolas (10) Patent No.: US 12,225,308 B2
(45) Date of Patent: Feb. 11, 2025

(54) PIXEL FOR INFRARED IMAGER INTEGRATING A BDI BIAS AND AN ACTIVE RESET

(71) Applicant: COMMISSARIAT A L'ENERGIE ATOMIQUE ET AUX ENERGIES ALTERNATIVES, Paris (FR)

(72) Inventor: Jean-Alain Nicolas, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 144 days.

(21) Appl. No.: 18/051,244

(22) Filed: Oct. 31, 2022

(65) Prior Publication Data

US 2023/0145351 A1 May 11, 2023

(30) Foreign Application Priority Data

Nov. 5, 2021 (FR) ...................................... 21 11758

(51) Int. Cl.
*H04N 25/75* (2023.01)
(52) U.S. Cl.
CPC .................................. *H04N 25/75* (2023.01)
(58) Field of Classification Search
CPC ......... H04N 25/75; H04N 25/77; H04N 25/65
See application file for complete search history.

(56) References Cited

U.S. PATENT DOCUMENTS

| | | |
|---|---|---|
| 2006/0023092 A1 | 2/2006 | Pain et al. |
| 2020/0106980 A1* | 4/2020 | Millet ..................... H04N 25/46 |

OTHER PUBLICATIONS

French Preliminary Search Report Issued Aug. 17, 2022, in French Application 21 11758 filed on Nov. 5, 2021(with English Translation of Categories of Cited Documents), 2 pages.
Fowler et al., "Low Noise Readout Using Active Reset for CMOS APS", In Sensors and Camera Systems for Scientific, Industrial, and Digital Photography Applications, Proceedings of SPIE, vol. 3965 Jan. 1, 2000, 10 Pages.
Fossum et al., "Infrared Readout Electronics for Space Science Sensors: State of the Art and Future Directions", Proc. SPIE 2020 (1993) 24 Pages.

\* cited by examiner

*Primary Examiner* — Yogesh K Aggarwal
(74) *Attorney, Agent, or Firm* — Oblon, McClelland, Maier & Neustadt, L.L.P.

(57) ABSTRACT

Imager readout circuit comprising:
  an active reset stage of the integration capacitor equipped with a first current amplifier,
  a buffered direct injection bias stage of the photodetector equipped with transistors forming a second current amplifier,
  a switching circuit comprising a coupling stage integrated in the readout circuit, the switching circuit being controlled by control signals and being configured to:
  during a reset phase of the integration capacitor corresponding to a first state of said control signals: couple said first current source to the integration capacitor and activate the first current amplifier while uncoupling said second current source of the photodetector and deactivating the second amplifier,
  during an integration phase of a current from the photodiode and corresponding to a second state of said control signals, couple said second current source to the photodetector and activate the second current amplifier while uncoupling said first current source of the integration capacitor and deactivating the first amplifier.

10 Claims, 6 Drawing Sheets

PIXEL FOR INFRARED IMAGER INTEGRATING A BDI BIAS AND AN ACTIVE RESET

TECHNICAL FIELD

The present invention relates to the field of imaging devices, and in particular visible or infrared. It more particularly applies to cooled infrared imagers and relates to the readout circuits of photodetector elements, and to the bias thereof.

It relates more specifically to an enhanced readout circuit or pixel in terms of injection yield and reset noise reduction and which can be adapted particularly to low flow applications.

PRIOR ART

When a scene is observed by an infrared imager formed of an array of detection elements, each detection element delivers a current proportional to the illuminance received by this element.

Figure 1:
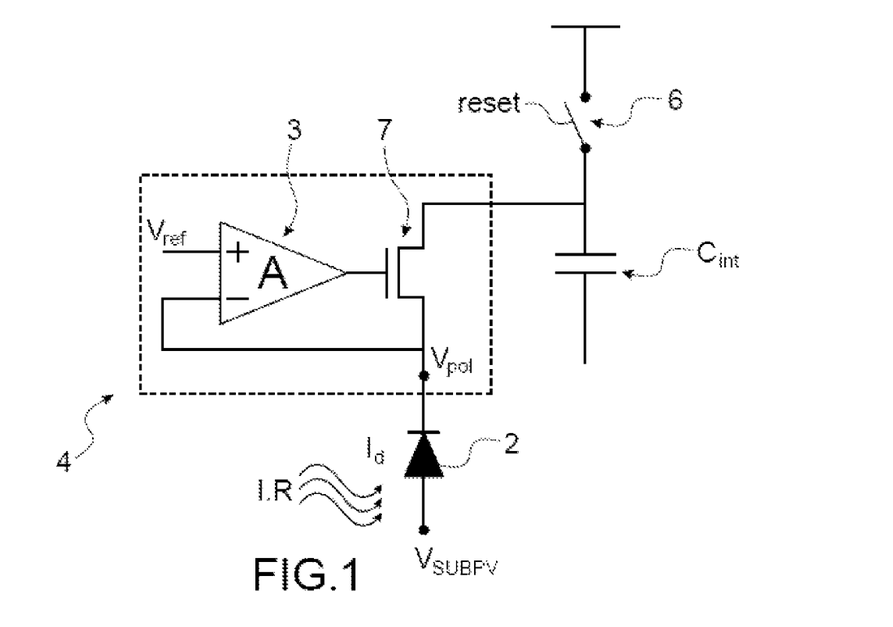
FIG. 1 serves to illustrate, in an infrared imager, an example of a readout pixel with a BDI (Buffered Direct Injection) type bias structure of the photodiode.

An existing infrared detection element IR structure is illustrated in FIG. 1. The detection element includes a photodiode 2 associated with and connected to a bias circuit. The current from the photodiode 2 is integrated by means of an integration capacitor Cint for a predefined time period. The bias circuit, the capacitor and a reset transistor are part of a circuit referred to as "readout circuit" or "readout pixel" with which the photodiode can be integrated. At the end of this period, each readout pixel supplies an item of information on the part of the scene observed by the photodiode 2 with which it is associated.

The state of an observed scene can therefore be monitored by means of the voltage at the terminals of the integration capacitor $C_{int}$. In the example illustrated, the current emitted by the photodiode 2 passes through a specific so-called Buffered Direct Injection (BDI) structure which serves to bias the photodiode 2 suitably and reaches the capacitor $C_{int}$.

This structure comprises a bias transistor 7, called a direct injection transistor, which is coupled with the photodiode 2 and with the integration capacitor $C_{int}$, with which an amplifier 3, in particular a differential gain amplifier A, is associated. An input of this amplifier is connected to a source electrode of the transistor 7 of the direct injection transistor. The output controls the gate voltage of the bias transistor 7. The source of the transistor 7 being connected to a terminal of the photodiode 2, there is then feedback established on a signal serving to bias the photodiode 2. Such an architecture meets a need to reduce the input impedance of the readout circuit since it can enable a reduction by a factor A (A being the gain of the amplifier) with respect to the use of a more conventional so-called direct injection (DI) structure without an amplifier and feedback. The BDI structure more specifically makes it possible to obtain these enhanced performances on the input impedance, while limiting the number of additional transistors required.

Before each new image, the integration capacitor $C_{int}$ of each pixel must be reset to the reference voltage thereof, which is referred to as the reset phase. This phase is generally carried out by means of a transistor 6 mounted as a switch which is closed (ON) so as to connect the integration capacitor $C_{int}$ to a reference voltage during the reset, and which is open during the integration phase.

However, during this reset step, a noise referred to as the reset noise is generated. Indeed, during the reset phase, the transistor used as a switch receives at the gate thereof a sufficient voltage so that it is in linear mode and is equivalent to the closed switch of resistance Ron. This resistance then generates a thermal noise.

The end of the reset phase and the start of the integration is marked by the opening of the switch, thus setting the thermal noise on the integration capacitor Cint, which involves an unknown on the initial voltage of the integration. This unknown is referred to as the reset noise.

In this case, a quadratic fluctuation of the voltage at the terminals of the integration capacitor can be estimated by the following expression:

$$\bar{v}_b^2 = \frac{k_B \cdot T}{Cint}$$

where kB is the Boltzmann constant, T the temperature, and Cint the value of the integration capacitor.

This reset noise can become a limiting factor of the imager performances. Therefore, it is sought to minimise it.

Figure 2:
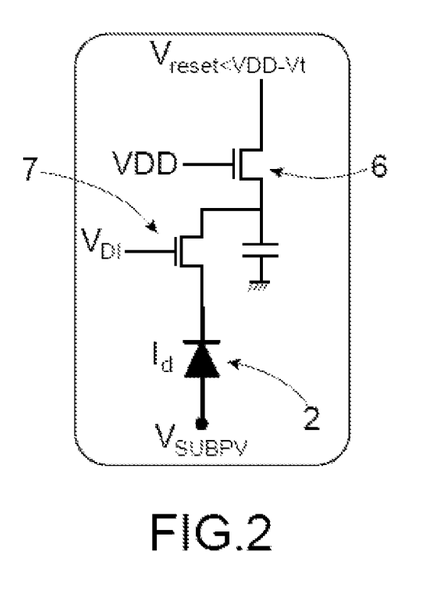
FIG. 2 serves to illustrate a first reset mode of a readout pixel of an imager.

A first reset mode of the type referred to as "hard reset" consists of biasing the switch transistor 6 in linear mode such that it acts as a closed switch. A reset voltage $V_{reset}$ such that $V_{reset} < VDD - Vt$ (where VDD is a high power supply potential and Vt the threshold voltage of the transistor 6) is applied to the drain of the reset transistor, whereas its gate is set to the power supply potential VDD. It is thus sought to place the integration capacitor Cint at the reset voltage $V_{reset}$.

Figure 3:
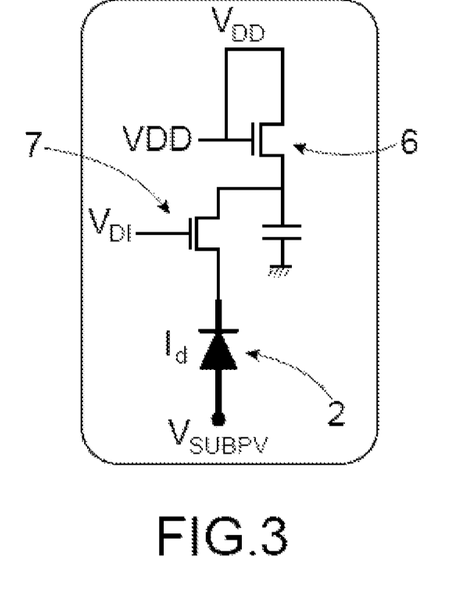
FIG. 3 serves to illustrate a second reset mode of a readout pixel of an imager.

A second reset mode referred to as "soft reset" is used in imagers operating in the visible range. In this case, the transistor 6 is biased in saturation mode with the drain and the gate thereof set to the high power supply potential VDD and the current passing through it is weak. The transistor 6 is then in weak inversion mode.

The drain and the gate of the transistor 6 are connected to a power supply voltage VDD, and the capacitor Cint is biased at the end of the reset to a voltage VDD−Vgs, where vgs is the source gate voltage of the transistor.

A reduction of the quadratic noise by a factor of 2 can be obtained in the second reset mode (soft reset):

$$\bar{v}_b^2 = \frac{k_B \cdot T}{2 \cdot C}$$

It may be sought to reduce this noise further for certain applications.

The document "Low noise readout using Active reset for CMOS APS", Boyd Fowler, Michael D. Godfrey, Janusz Balicki, and John Canfield. Pixel Devices International Inc. Proceedings of SPIE, the international society for optical engineering, May 2000, describes an alternative reset technique referred to as "active reset" capable of reducing the reset noise further.

This method is applied in this article to an image operating in the visible range. It uses an amplifier which serves as an active element and which makes it possible to make a precise measurement of the noise and to retroact on the reset transistor via a feedback loop. In this case, according to the article, the quadratic noise can be reduced in theory by a factor A, A being the gain of the amplifier stage.

$$\bar{v}_b^2 = \frac{k_B \cdot T}{A \cdot C}$$

The problem arises of producing an image with a reduced quadratic noise during the reset phase while retaining a low input impedance during the readout phases.

DISCLOSURE OF THE INVENTION

An aim of the invention is that of implementing an imaging device wherein each detection element is provided with a readout circuit equipped at the same time with a buffered direct injection (BDI) bias stage and an active reset stage.

Thus, according to an aspect, the present invention relates to an imaging device including a plurality of detection elements, each detection element being formed from a photodetector associated with and connected to a readout circuit of a signal generated by the photodetector, the readout circuit being equipped with an integration capacitor for storing charges from the photodetector, the readout circuit further comprising:

- an active reset stage of the integration capacitor equipped with transistors forming a first current amplifier of a first current source,
- a buffered direct injection bias stage of the photodetector equipped with transistors forming a second current amplifier of a second current source,
- a switching circuit comprising a coupling stage integrated in the readout circuit, the switching circuit being controlled by control signals and being configured to:
  - during a reset phase of the integration capacitor corresponding to a first state of said control signals: couple said first current source to the integration capacitor and activate the first current amplifier while uncoupling said second current source of the photodetector and deactivating the second amplifier,
  - during an integration phase of a current from the photodiode and corresponding to a second state of said control signals, couple said second current source to the photodetector and activate the second current amplifier while uncoupling said first current source of the integration capacitor and deactivating the first amplifier.

Such a device makes it possible to obtain a low input resistance and hence a high injection yield while having a low reset quadratic noise.

Advantageously, the first current source and the second current source are the same current source which is common to the first amplifier and the second current amplifier.

This can particularly enable a gain in terms of size of the readout circuit.

According to an implementation option, the first amplifier and the second amplifier can be formed from a transistor mounted as a current source and respectively from a first amplification transistor and a second amplification transistor, the switching circuit being furthermore configured to:

- during said reset phase, couple the common current source to the integration capacitor while isolating the photodetector from said common current source,
- during said integration phase, couple the common current source to the photodiode while isolating the integration capacitor from said common current source. This can particularly make it possible to reduce the current consumption required to perform the different operating phases.

According to an implementation option, the transistor mounted as current source receives on the gate thereof a modulable bias voltage $v_{bias}$ between said reset phase and said integration phase, such that during said reset phase, the bias voltage $v_{bias}$ has a first value such that the common current source produces a first current $I_1$, and such that during the integration phase, the bias voltage has a second value, such that the common current source produces a second current $I_2$ different from said first current.

The coupling stage cited above can be formed from a first coupling transistor and a second coupling transistor. The control signals include a first coupling control signal $vc_1$ applied to a gate of the first coupling transistor and a second coupling control signal $vc_2$ applied to a gate of the second coupling transistor.

Advantageously, the switching circuit can be furthermore formed from a first switch element and a second switch element belonging to a bias module external to the readout circuit.

The first switch element can be configured to alternately, couple during the integration phase, an electrode of an amplification transistor of the first amplifier to a circuit element set to a first bias potential VBDI and uncouple during said reset phase said circuit element from said electrode of said transistor of said first amplifier.

The second switch element can be configured to alternately, uncouple during said integration phase, an electrode of an amplification transistor of the second amplifier from a circuit element set to a second bias potential Vref and couple during said reset phase, the electrode of said amplification transistor of said second amplifier of said circuit portion.

According to an implementation option, the active reset stage of the integration capacitor $C_{int}$ is equipped with a reset transistor having an electrode set to a reset potential and coupled with the integration capacitor, the first coupling transistor being arranged between a gate of the reset transistor and said first amplifier.

According to an implementation option, the buffered direct injection bias stage comprises a so-called direct injection transistor arranged between the photodetector and the integration capacitive capacitor, the second coupling transistor being arranged between a gate of the direct injection transistor and said second amplifier.

Advantageously, the first current amplifier can consist of two transistors having a common electrode.

Advantageously, the second current amplifier can consist only of two transistors having a common electrode.

According to a specific aspect, the invention relates to an infrared imager comprising an imaging device as defined above.

BRIEF DESCRIPTION OF THE DRAWINGS

The present invention will be understood more clearly based on the following description of the appended drawings wherein.

Identical, similar or equivalent parts of the different figures bear the same reference numbers so as to facilitate the transition from one figure to another.

The different parts represented in the figures are not necessarily on a uniform scale, in order to render the figures more readable.

DETAILED DISCLOSURE OF SPECIFIC EMBODIMENTS

Figure 4:
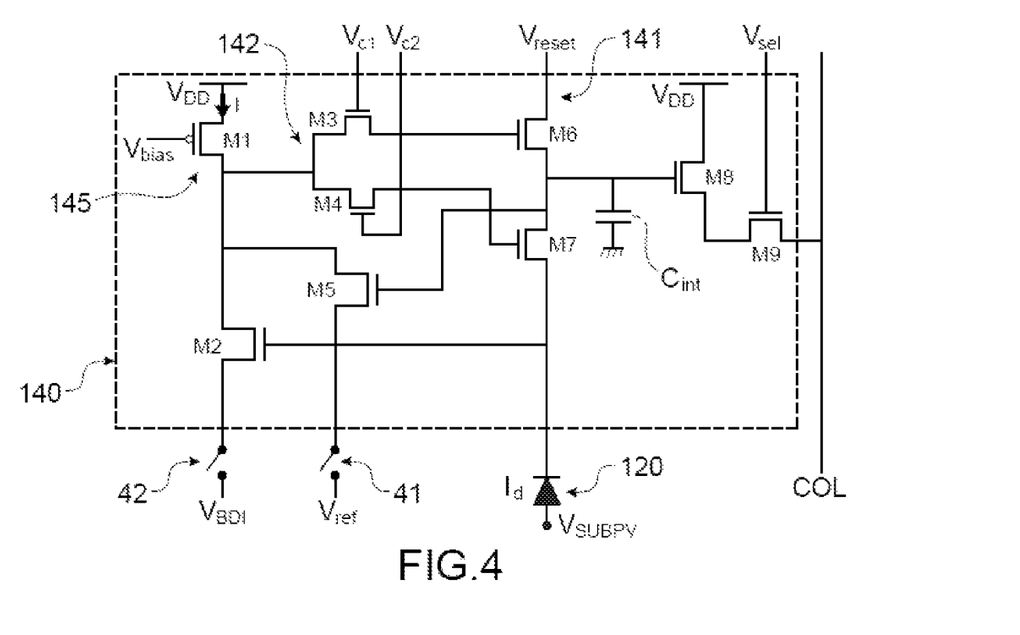
FIG. 4 serves to illustrate a specific example of an imager readout pixel as implemented according to the invention and making it possible to embody an active reset and a buffered direct injection (BDI) type bias.

Reference is now made to FIG. 4 giving an example of a readout circuit 140 of an imager as implemented according to an embodiment of the present invention. The imager is, in this example, an infrared imager.

The readout circuit 140, also referred to as "readout pixel" or "pixel", is connected to a photodetector such as a photodiode 120. The photodiode 120 here converts an IR radiation into an electric current. The readout circuit 140 associated with the photodiode 120 form a detection element. The image generally includes a plurality of detection elements typically arranged in an array.

The photodiode 120 is in this example reverse biased and delivers a representative current of an observed scene to the readout circuit 140. The photodiode 120 can be mounted on the readout circuit 140 according to an assembly commonly known as "hybridisation". The readout circuit 140 and the photodiode 120 are in this case mechanically and electrically connected via conductive elements such as for example metal beads.

To bias the photodiode 120, a potential Vsubpv is applied to one of the terminals thereof, whereas the other terminal is coupled to a first part 141 of the readout circuit 140, in the form of a transistor circuit.

In this specific embodiment example, this first part 141 of the readout circuit 140 is formed from transistors $M_1$, $M_2$, $M_3$, $M_4$, $M_5$, $M_6$, $M_7$, typically of MOS type and an integration capacitor $C_{int}$. This integration capacitor $C_{int}$ can in turn be formed from a transistor in which the source and the drain are short-circuited.

The first part 141 of the readout circuit 140 is provided with an active reset stage to be able to reset the integration capacitor $C_{int}$ to a given potential once an integration phase of the current of the photodiode 120 is completed.

The active reset stage is equipped with a reset transistor $M_6$, including an electrode, in this example the drain, connected to a bias potential $V_{reset}$ and another electrode, in this example the source, connected to the integration capacitor $C_{int}$. The reset stage here has the specificity of being equipped with a current amplifier referred to as "first current amplifier", the output of which is capable of being coupled to the reset transistor $M_6$ and of acting on this transistor $M_6$, in particular on the gate thereof, whereas an input of the first amplifier is connected to the reset transistor $M_6$ so as to form feedback.

Such an arrangement makes it possible to make a precise noise measurement and reduce the quadratic noise at the terminals of the integration capacitor $C_{int}$. The active reset stage is here provided with transistors $M_1$, $M_5$ capable of forming this current amplifier. In the specific embodiment example illustrated, a transistor $M_1$, mounted as a current source and a so-called amplification transistor $M_5$ mounted as a common source with the transistor $M_1$ form the first amplifier. Thus, advantageously, this first current amplifier can consist only of two transistors $M_1$, $M_5$, having a common electrode, which helps obtain a compact readout circuit.

The readout circuit 140 is also provided with a buffered direct injection (BDI) bias of the photodiode 120. The buffered direct injection bias stage is provided with a direct injection transistor $M_7$, with an electrode connected to the integration capacitor $C_{int}$ and another electrode connected to the photodiode 120.

The direct injection transistor $M_7$ mounted in cascade with the photodiode 120 makes it possible to maintain a fixed bias on the photodiode 120 during an integration phase of the current of the photodiode 120 by the integration capacitor Cint. This makes it possible to readily isolate the photodiode 120 from the voltage variations at the terminals of the storage capacitor without adding a large number of transistors.

The bias of the photodiode 120 implemented during the integration phase is here more specifically performed by means of a buffered direct injection (BDI) making it possible to obtain a low input impedance Rin of the readout circuit 140 and obtain an enhanced injection yield (in 1/Rin). Here a current amplifier referred to as second current amplifier and formed from transistors $M_1$, $M_2$ is relied upon. The second current amplifier $M_1$-$M_2$ has an output capable of being coupled with the direct injection transistor $M_7$ and acting upon this transistor $M_7$, whereas an input of the second amplifier is connected to the direct injection transistor $M_7$ so as to form feedback. In the specific embodiment example illustrated, a transistor $M_1$, mounted as a current source and a so-called amplification transistor $M_2$ mounted as a common source with the transistor $M_1$ form the second amplifier. Thus, advantageously, this second current amplifier can consist only of two transistors $M_1$, $M_2$ having a common electrode. This also helps obtain a compact readout circuit.

In the specific embodiment example illustrated in FIG. 4, the readout circuit 140 comprises, advantageously, a circuit portion forming a current source which here has the specificity of being common with the first current amplifier M1-M5 and with the second current amplifier M1-M2.

Figure 6:
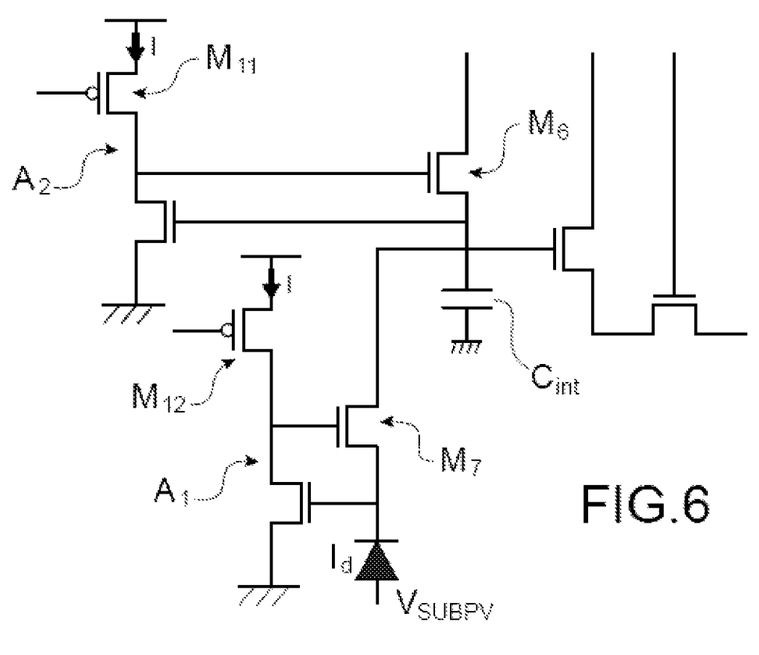
FIG. 6 serves to illustrate an alternative embodiment of a readout pixel with two separate current sources.

The first amplifier and the second amplifier thus share the same transistor $M_1$ mounted as a current source, which particularly makes it possible to save space with respect to another arrangement as illustrated in FIG. 6, where the current amplifiers A1, A2 use two separate current sources implemented using two transistors $M_{11}$, $M_{12}$ mounted as a current source.

Besides saving space, the embodiment illustrated in FIG. 4 is more advantageous than that in FIG. 6 in terms of consumption. Indeed, two current sources, with simultaneous consumption of two currents, are replaced by a single current source. This proves to be particularly advantageous, particularly in the case of certain applications for which the pixel is operated at cryogenic temperatures and where any additional heat dissipation gives rise to a high energy cost for the cooling system.

The current delivered by the current source is typically set via a bias voltage vbias applied to the gate of the transistor $M_1$, and which is capable of varying according to the different operating phases of the readout circuit. The bias voltage vbias can be placed at one value during the reset phase and at another value during the integration phase, such that the current source produces a first current during the reset phase, the current source produces a second current different from that generated during the reset phase.

To enable the pooling of an active reset stage and a buffered direct injection (BDI) bias, a switching system is provided between the reset and bias stages. Thus, the imaging device here also has the specificity of being furthermore provided with a switching circuit capable of adopting, according to the respective control signal states of this circuit, different configurations according to the different operating phases of the readout circuit, and in particular between an integration phase of the current of the photodiode 120 and a reset phase of the integration capacitor $C_{int}$.

The switching circuit is provided with a coupling stage 142 integrated in the readout circuit 140 and formed from a first coupling transistor $M_3$ and a second coupling transistor $M_4$, in which the respective states, from an ON state and an OFF state, are controlled respectively via a first coupling control signal Vc1 and a second coupling control signal Vc2. The coupling control signals Vc1, Vc2 are here applied respectively to the gate of the first coupling transistor $M_3$ and to the gate of the second coupling transistor $M_4$.

The communication stage is capable of adopting different configurations whereas the associated control signals Vc1, Vc2 can adopt different states from one phase of readout circuit operation to another.

Besides the switching stage formed from the transistors $M_3$, $M_4$, the switching circuit is, in this embodiment example, also equipped with a first switch element 41 and a second switch element 42 belonging this time to an external bias module to the readout circuit 140.

The external bias module can be a circuit located at the edge of the array of detection elements and therefore located outside this array. The external bias module can be configured to apply bias signals to the respective readout circuits 140 and in particular to the respective transistor stages 141 of several detection elements 130.

The first switch element 41 is configured to alternately couple, during the integration phase, an electrode of the transistor M5 to a bias potential Vref and uncouple, during a reset phase, the electrode of the transistor M5 from the bias potential Vref.

The second switch element 42 is for its part configured to alternately uncouple, during the integration phase, an electrode of the transistor M2 of the second amplifier from a bias potential VBDI and couple, during a reset phase, the same electrode of the transistor M2 to the bias potential VBDI.

Figure 5A:
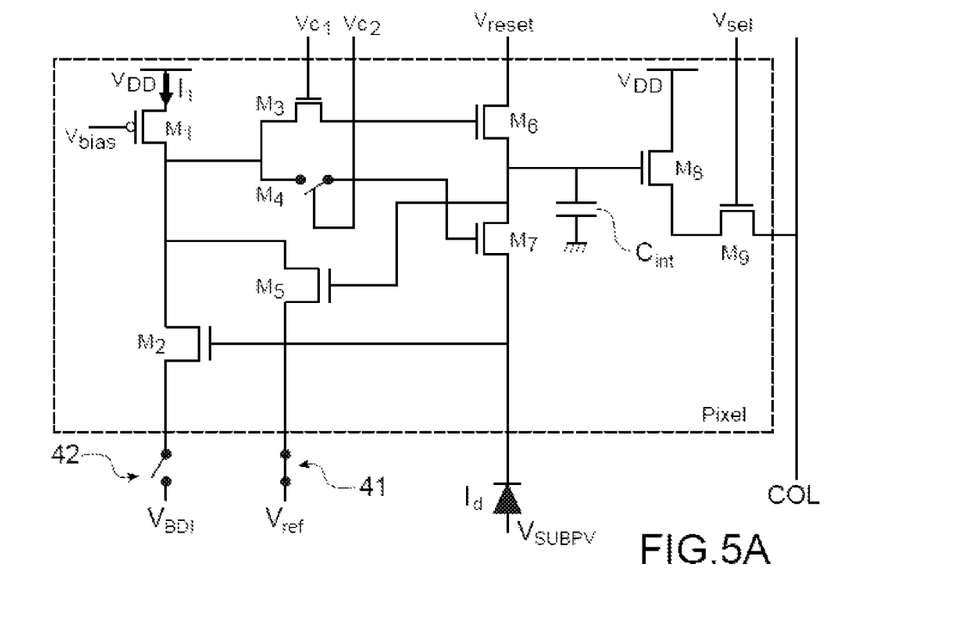
FIG. 5A serves to illustrate a first configuration of the readout pixel to implement an active reset during a reset phase of an integration capacitor.

In FIG. 5A, the readout circuit 140 is in a reset configuration, corresponding to a first state of the control signals of the switching circuit. Of these control signals, the respective coupling control signals $vc_1$, $vc_2$ of the coupling transistors $M_3$, $M_4$ are provided respectively so as to place the first coupling transistor $M_3$ in an ON state and place the second coupling transistor $M_4$ in an OFF state. The switches 41, 42 are, for their part, respectively placed in a closed state (i.e. ON) and in an open state (i.e. OFF).

A first current I1 is generated and amplified by the first amplifier M1-M5 and this amplifier is coupled with the reset transistor M6. The stage formed from the transistors M1, M2 and M6 operates as an active reset stage.

The respective states of the transistor M3 and the switch 41 are such that during the reset phase the current source formed by the transistor M1 is coupled with the reset transistor M6 in turn coupled with the integration capacitor $C_{int}$ and the first current amplifier M1-M5 is activated.

The respective states of the transistor M4 and the switch 42 are such that the current source is uncoupled from the photodiode 120 and that the second amplifier is deactivated.

During this reset phase, the photodiode 120 is biased by a DI ("Direct Injection") type bias structure via the direct injection transistor $M_7$. The capacitor on the gate of this transistor $M_7$ makes it possible to keep the voltage obtained during a previous integration phase where the photodiode 120 was then biased in a BDI type bias mode. The voltage obtained at the end of reset on the integration capacitor $C_{int}$ can be set by means of the connection of the switch 41 to the bias voltage $V_{ref}$ applied on an electrode of the amplification transistor $M_5$, here the source thereof.

The bias voltage $V_{ref}$ makes it possible to set the reset voltage. According to a specific embodiment, instead of applying a fixed bias voltage $V_{ref}$ during the reset phase, the voltage $V_{ref}$ can be made to vary during the reset phase and be applied in the form of a voltage ramp, according to a variation which can increase or decrease linearly.

In some cases, the reset phase can comprise the prior implementation of a so-called "hard" reset phase as described above with reference to FIG. 2, in order to remove any remanence from one image to another. Thus, the reset stage carried out makes it possible to perform both an active reset and a "hard reset" type reset.

To carry out such a "hard reset", the coupling transistors $M_3$, $M_4$ are controlled in the same way as for an active reset as described above. Thus, during the "hard reset" step, the first coupling transistor $M_3$ is activated (ON) and the second coupling transistor $M_4$ deactivated (OFF).

The voltage Vbias which, in a normal operating mode, makes it possible to set the value of the current in the amplifier, is this time set to another value, so as to bias the reset transistor $M_6$ in linear mode. In this example, the gate of the reset transistor $M_6$ is more specifically set to a potential greater than the sum $Vt+V_{reset}$ of the reset voltage $V_{reset}$ and the threshold voltage of the transistor $M_6$.

By suitably choosing the reset voltage $V_{reset}$, a hard reset type reset of the integration capacitor is then carried out. Once this step has been performed, an active reset can then be continued as described above. Thus, during the same reset phase, the bias voltage vbias is capable of being modified and varying.

Once the reset phase is complete, which results in a reset of the voltage of the integration capacitor to a desired value, an integration phase can be commenced during which the voltage variation of the integration capacitor $C_{int}$ expresses the acquisition of an item of luminous flux information.

Figure 5B:
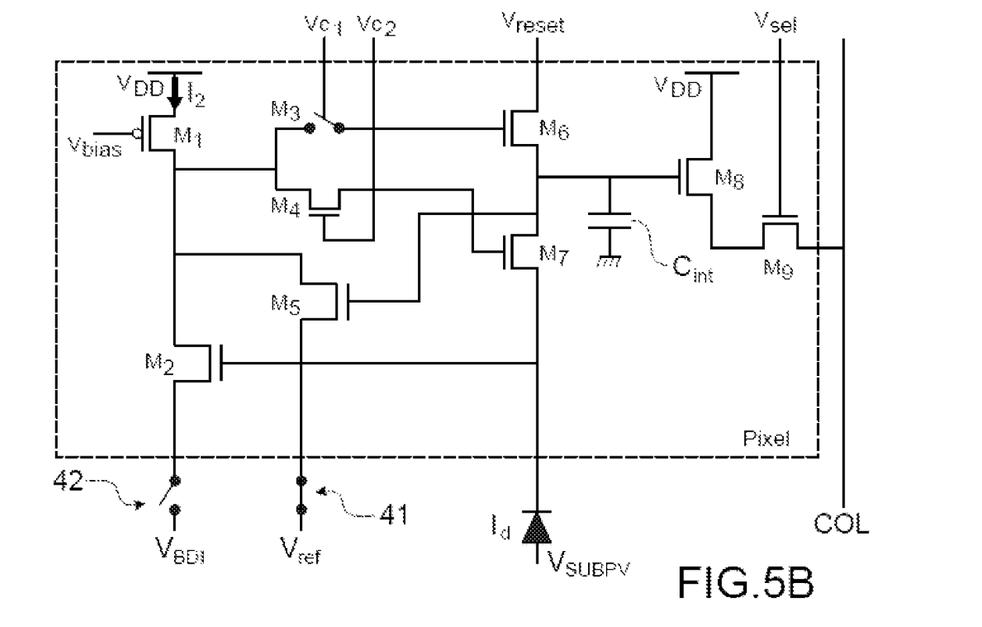
FIG. 5B serves to illustrate a second configuration of the readout circuit during a current integration phase by the integration capacitor to implement a buffered direct injection type bias.

In FIG. 5B, the circuit represented is in the integration configuration thereof, corresponding to two respective states of the control signals $vc_1$, $vc_2$ of the coupling transistors $M_3$, $M_4$, separate from that adopted during the reset phase.

The first coupling transistor $M_3$ is then set, via the first control signal $vc_1$ applied to the gate thereof in an OFF state, equivalent to an open switch. The reset transistor $M_6$ is thus rendered isolated from the current source formed by the first transistor $M_1$.

The second coupling transistor $M_4$ is for its part set, via the second control signal $vc_2$ applied to the gate thereof, to an ON state enabling it to connect the transistor $M_7$ to the amplifier formed by the transistors $M_1$, $M_2$ in order to produce a BDI type bias structure and obtain good stabilisation of the photodiode voltage. A current $I_2$ delivered by the current source produced using the transistor $M_1$ is this time directed towards the transistor $M_2$ in which the gate sets the bias voltage of the photodiode 120. The current $I_2$ required for the amplifier in the integration phase is typically different from that required for the reset phase and is here modulated by means of the voltage Vbias applied to the gate of the transistor $M_1$ forming the current source. Therefore, the coupling stage equipped with the transistors $M_3$, $M_4$ has here a different configuration from the switches thereof in order to obtain a bias assembly of the BDI type photodiode.

The switches 41, 42 are also set in respective states different from those adopted during the reset phase. During the integration phase, the switches 41, 42 are, for their part, respectively placed in an open state (i.e. OFF or non-conducting) and in a closed state (i.e. ON).

The respective states of the transistor M4 and the switch 42 are such that during the integration phase the current source formed by the transistor M1 is coupled with the transistor M7 in turn coupled with the photodiode while the second current amplifier M1-M2 is activated.

The respective states of the transistor M3 and the switch 41 are such that the current source is uncoupled from the integration capacitor and that the first amplifier is deactivated.

The readout circuit 140 is also equipped with a follower transistor $M_8$ and a line selection transistor $M_9$. The transistors $M_8$ and $M_9$ are in this example also N-type, in particular NMOS. It is however possible to provide associating the stage 141 with transistors $M_1$, $M_2$, $M_3$, $M_4$, $M_5$, $M_6$, $M_7$ with another type of structure downstream from the capacitor Cint than that in the example illustrated.

In the specific embodiment example described above with reference to FIGS. 4, 5A, 5B, a transistor M1 is provided, forming the current source which is PMOS type whereas the other transistors of the pixel and in particular the transistors M2, M5, M6, M7 are NMOS type.

An alternative embodiment of the example described above is given in FIG. 7, and provides, instead of an N-on-P type photodiode, a P-on-N type photodiode 120. In this case, the transistors M2, M3, M4, M5, M6, M7, M8, M9 can be PMOS type transistors and the transistor M1 forming the current source can this time be NMOS type.

Figure 7:
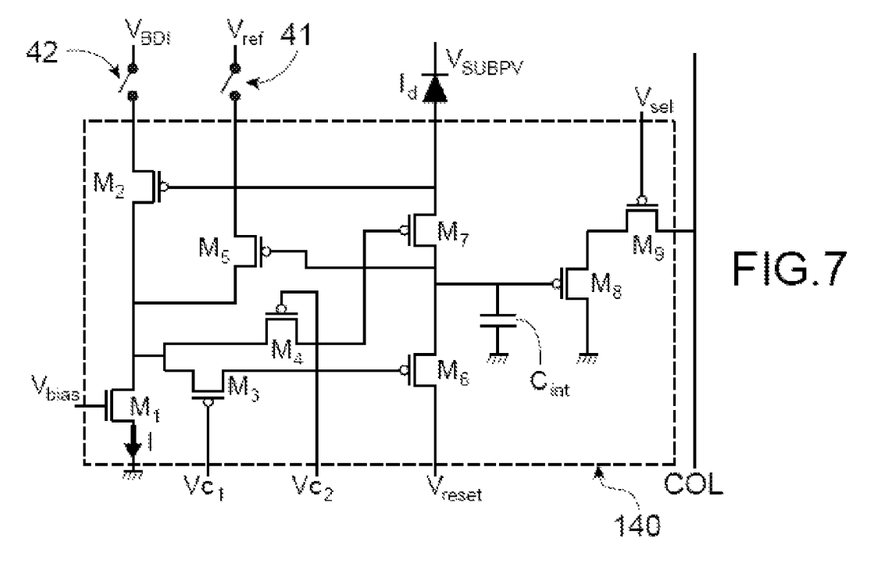
FIG. 7 serves to illustrate an alternative arrangement of the readout circuit adapted to a connection thereof on a zone P of a P-on-N type photodiode.
Figure 8:
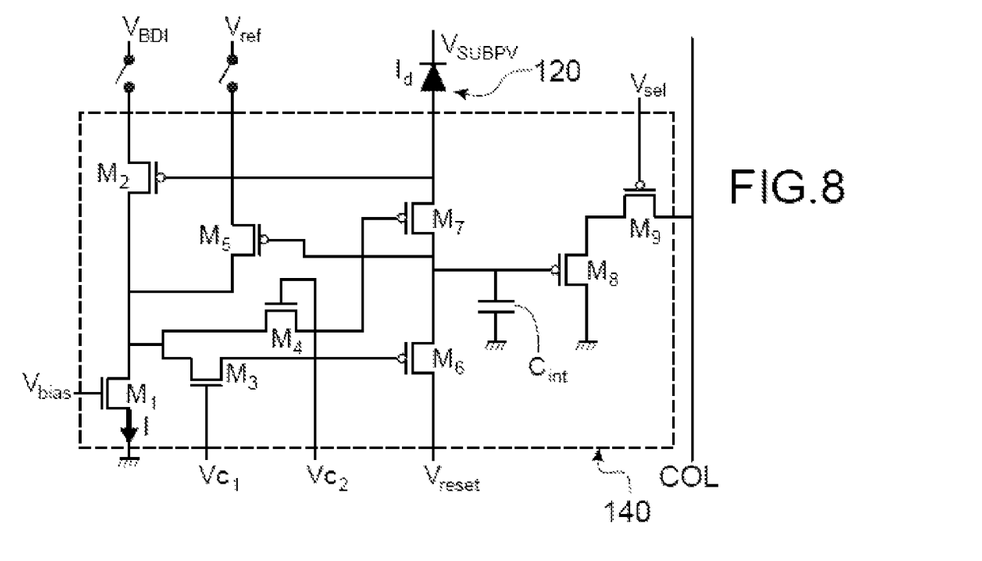
FIG. 8 serves to illustrate a further alternative arrangement of the readout circuit adapted to a connection thereof on a zone P of a P-on-N type photodiode, the readout circuit being equipped this time with NMOS type coupling transistors.

A further alternative embodiment illustrated in FIG. 8 differs from that illustrated in FIG. 7, in that the coupling transistors M3, M4 are this time PMOS type, in order to make the control thereof easier via the control signals Vc1, Vc2. The other transistors M2, M5, M7, M6 are of opposite conduction type to that of the transistor M1 forming the current sources, for example NMOS transistors.

The embodiment examples described above proposed relate more specifically to the case of photodiodes produced on a specific substrate and different from that of the readout pixel, and where the photodiode array is connected to the readout circuit by hybridisation. However, a circuit can also be provided where the photodiode 120 is produced in the pixel, which then contains the photodiode and the readout circuit.

Figure 9:
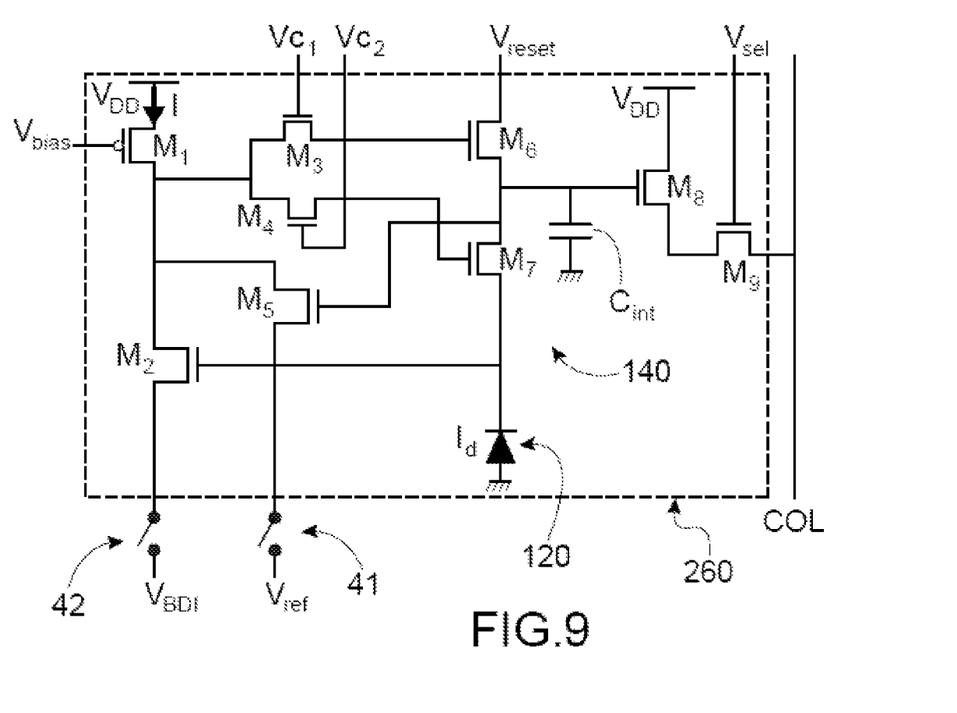
FIG. 9 serves to illustrate a further alternative arrangement of the readout circuit adapted to a structure wherein the readout circuit and the photodiode are co-integrated in the same pixel and produced on the same substrate.

Thus, according to an alternative embodiment of one or the other of the embodiment examples described above where the photodiode is hybridised on a readout circuit, it is possible to provide as in FIG. 9, a photodiode 120 integrated in the pixel 260, the photodiode 120 and the transistors M1, M2, M3, M4, M5, M6, M7, M8, M9 then optionally being integrated in the same circuit produced on the same substrate.

In one or the other of the embodiment examples described above with reference to FIGS. 4, 5A, 5B, 7, 8, the current source is pooled to carry out the bias by buffered direct injection (BDI) and to carry out the active reset.

As stated above with reference to FIG. 6, it is also possible in the case where the size and consumption constraints are lower, to provide a circuit with two separate current sources associated respectively with the buffered direct injection (BDI) bias stage and with the reset stage.

Figure 10:
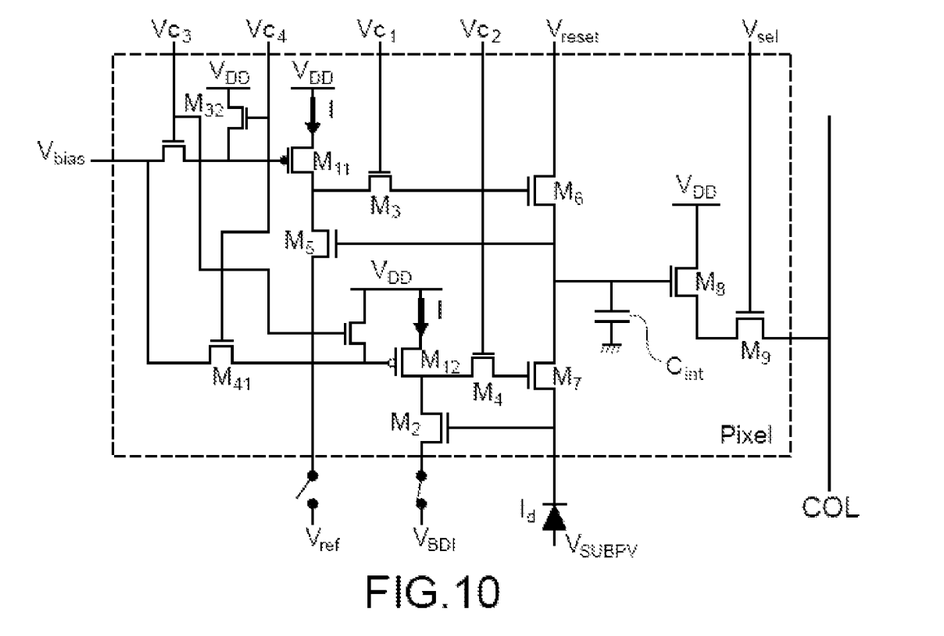
FIG. 10 serves to illustrate an alternative embodiment of the readout pixel with two separate current sources and which operate in alternation according to whether it is in a reset phase or a current integration phase.

In the embodiment example illustrated in FIG. 10, an improvement of this device with two current sources is provided. Thus, to avoid simultaneous consumption of these two current sources formed by the transistors M11, M12 in this PMOS type example, it is provided here to switch off the current in the unused amplifier. The switching circuit is provided with additional switching elements, in particular in the form of switching transistors M31, M42, in which the ON or OFF state is controlled respectively via a control signal Vc3 applied to the respective gates thereof, and of switching transistors M32, M41, in which the OK or OFF state is controlled respectively via another control signal Vc4 applied to the respective gates thereof.

A first switching transistor M31 is equipped with an electrode receiving the bias voltage Vbias and another electrode coupled to the transistor M11 forming a first current source. A second switching transistor M41 is equipped with an electrode receiving the bias voltage Vbias and another electrode coupled to the transistor M12 forming a second current source.

A third switching transistor M32 is equipped with an electrode at a power supply voltage and another electrode coupled to the transistor M11 forming a first current source.

A fourth switching transistor M42 includes an electrode receiving the power supply voltage and another electrode coupled to the transistor M12 forming a second current source.

The power supply voltage can be provided high VDD or low GND according to the N or P type, of the transistors M11, M12 forming the current sources.

In the specific embodiment example illustrated where the third switching transistor M32 and the fourth switching transistor M42 are PMOS type, the power supply voltage is a high voltage VDD, for example 3.3 Volts.

During a reset phase, the state of the control signal $vc_3$, is such that the first switching transistor M31 and the fourth switching transistor M42 are set to ON. Thus, respectively, the current source transistor M11 is coupled with the bias voltage Vbias and the power supply voltage is coupled with the other current source transistor M12.

The state of the control signal $vc_4$, is such that the third switching transistor M32 is set to OFF and the fourth switching transistor M42 is also set to OFF. Thus, the first current source operates while the second current source is deactivated and isolated from a circuit portion delivering the bias voltage Vbias.

During an integration phase, the respective state of the control signals $vc_3$, vc4 is reversed with respect to that of the reset phase. The first current source is then deactivated and isolated from a circuit portion delivering the bias voltage Vbias, whereas the second current source is operating.

The invention claimed is:

1. An imaging device comprising:
a plurality of detection elements, each detection element being formed from a photodetector associated with and connected to a readout circuit of a signal generated by the photodetector, the readout circuit being equipped with an integration capacitor for storing charges from the photodetector,
wherein the readout circuit further includes:
an active reset stage of the integration capacitor equipped with transistors forming a first current amplifier of a first current source,
a buffered direct injection bias stage of the photodetector equipped with transistors forming a second current amplifier of a second current source,
a switching circuit comprising a coupling stage integrated in the readout circuit, the switching circuit being controlled by input control signals and being configured to:
during a reset phase of the integration capacitor corresponding to a first state of said control signals: couple said first current source to the integration capacitor and activate the first current amplifier while uncoupling said second current source of the photodetector and deactivating the second current amplifier, and
during an integration phase of a current from the photodiode and corresponding to a second state of said control signals, couple said second current source to the photodetector and activate the second current amplifier while uncoupling said first current source of the integration capacitor and deactivating the first current amplifier.

2. The imaging device according to claim 1, wherein the first current source and the second current source are the same current source common to the first current amplifier and the second current amplifier.

3. The imaging device according to claim 2, wherein the first current amplifier and the second current amplifier are formed from a transistor mounted as a current source and respectively from a first amplification transistor and a second amplification transistor, the switching circuit being further configured to:
during said reset phase, couple the common current source to the integration capacitor while isolating the photodetector from said common current source, and
during said integration phase, couple the common current source to the photodiode while isolating the integration capacitor from said common current source.

4. The imaging device according to claim 3, wherein the transistor mounted as current source receives on the gate thereof a modulable bias voltage between said reset phase and said integration phase, such that during said reset phase, the bias voltage has a first value such that the common current source produces a first current, and such that during the integration phase, the bias voltage has a second value, such that the common current source produces a second current different from said first current.

5. The imaging device according to claim 1, wherein the coupling stage is formed from a first coupling transistor and wherein the coupling stage is formed from a second coupling transistor, and wherein the control signals include a first coupling control signal applied to the gate of the first coupling transistor and a second coupling control signal applied to the gate of the second coupling transistor.

6. The imaging device according to claim 5, wherein the switching circuit is furthermore formed from a first switch element and a second switch element belonging to an external bias module to the readout circuit, the first switch element being configured to alternately, couple during the integration phase, an electrode of an amplification transistor of the first amplifier to an circuit element set to a first bias potential and uncouple during said reset phase said circuit element from said electrode of said transistor of said first current amplifier, the second switch element being configured to alternately, uncouple during said integration phase, an electrode of an amplification transistor of the second current amplifier from a circuit portion set to a second bias potential and couple during said reset phase, the electrode of said amplification transistor of said amplifier of said circuit portion.

7. The imaging device according to claim 5, wherein the active reset stage of the integration capacitor is equipped with a reset transistor having an electrode set to a reset potential and coupled with the integration capacitor, the first coupling transistor (M3) being arranged between a gate of the reset transistor and said first current amplifier.

8. The imaging device according to claim 5, wherein the buffered direct injection bias stage comprises a so-called direct injection transistor arranged between the photodetector and the integration capacitor, the second coupling transistor being arranged between a gate of the direct injection transistor and said second current amplifier.

9. The imaging device according to claim 1, wherein the first current amplifier consists of two transistors having a common electrode and/or wherein the second current amplifier consists of two transistors having a common electrode.

10. An infrared imager comprising the imaging device according to claim 1.

* * * * *